United States Patent
Liu

(10) Patent No.: US 12,269,309 B2
(45) Date of Patent: Apr. 8, 2025

(54) SUSPENSION STROKE RELATED VALUE ESTIMATION DEVICE AND METHOD

(71) Applicant: TOYOTA JIDOSHA KABUSHIKI KAISHA, Toyota (JP)

(72) Inventor: Yanqing Liu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 629 days.

(21) Appl. No.: 17/501,335

(22) Filed: Oct. 14, 2021

(65) Prior Publication Data
US 2022/0118812 A1 Apr. 21, 2022

(30) Foreign Application Priority Data
Oct. 16, 2020 (JP) .................. 2020-174527

(51) Int. Cl.
*B60G 17/00* (2006.01)
*B60G 17/018* (2006.01)
*B60G 17/06* (2006.01)

(52) U.S. Cl.
CPC ......... *B60G 17/0182* (2013.01); *B60G 17/06* (2013.01); *B60G 2204/62* (2013.01); *B60G 2400/202* (2013.01); *B60G 2400/252* (2013.01); *B60G 2500/104* (2013.01); *B60G 2600/182* (2013.01); *B60G 2600/70* (2013.01); *B60G 2600/73* (2013.01); *B60G 2800/162* (2013.01); *B60G 2800/70* (2013.01); *B60G 2800/916* (2013.01)

(58) Field of Classification Search
CPC .................................................. B60G 17/0182

USPC ............................................................ 701/37
See application file for complete search history.

(56) References Cited

U.S. PATENT DOCUMENTS 5,987,368 A * 11/1999 Kamimae .............. B60G 17/08
280/5.515

FOREIGN PATENT DOCUMENTS

JP 09-309315 A 12/1997

OTHER PUBLICATIONS

Akihito Yamamoto et al., "Study of Practical Observer for Semi-active Suspensions", JSAE, May 2017, pp. 687-692, vol. 48, No. 3.

* cited by examiner

*Primary Examiner* — Logan M Kraft
*Assistant Examiner* — Joshua Campbell
(74) *Attorney, Agent, or Firm* — Sughrue Mion, PLLC

(57) ABSTRACT

A control unit that controls control currents supplied to shock absorbers that generate damping forces according to the control currents determines coefficients of two functions that functionally identify an equivalent damping coefficient and an equivalent spring constant of each suspension based on relationships between the control current supplied to each shock absorber and the coefficients of the two functions that change according to the control current and a frequency of a relative vibration between a sprung and an unsprung of a vehicle, and calculates a relative displacement or a relative velocity between the sprung and the unsprung based on a vertical acceleration detected by a detection device and the two functions in which the coefficients are determined.

11 Claims, 10 Drawing Sheets

SUSPENSION STROKE RELATED VALUE ESTIMATION DEVICE AND METHOD

CROSS-REFERENCE TO RELATED APPLICATION

This application claims priority to Japanese Patent Application No. JP2020-174527 filed on Oct. 16, 2020, the content of which is hereby incorporated by reference in its entirety into this application.

BACKGROUND

1. Technical Field

The present disclosure relates to a suspension stroke related value estimation device and method for a vehicle such as an automobile.

2. Description of the Related Art

It is known to estimate suspension stroke velocity and stroke (hereinafter referred to as "suspension stroke related value") using an observer based on a vertical acceleration of a sprung at each wheel position.

For example, in Japanese Patent Application Laid-open No. H09-309315, it is described that an observer is constructed by designing coefficients of an equation for estimating a suspension stroke related value based on an estimated damping coefficient of a shock absorber, and a suspension stroke related value is estimated by using the observer.

In JSAE, Vol. 48, No. 3, 2017, it is described that, in making an observer for estimating suspension stroke related values in a semi-active suspension, a delay due to hysteresis of a damping force generated by a shock absorber is taken into consideration.

In the conventional suspension stroke related value estimation methods described in the above documents, there is a problem that suspension stroke related values cannot be estimated with high accuracy for the following reasons in a region where a frequency of relative vibration between a sprung and an unsprung is relatively high. In particular, in a region where a frequency of relative vibration is relatively high, there is a problem that a gain of an estimated value with respect to a true value of a suspension stroke related value decreases and a phase shift of the estimated value with respect to the true value becomes large.

First of all, a spring force of a suspension is not linear but non-linear because it is generated not only by a suspension spring but also by rubber bushes and the like, but this fact is not taken into consideration. Secondly, in the estimation method described in the above latter document, a delay due to hysteresis of a damping force generated by a shock absorber is taken into consideration, but damping due to friction between suspension parts other than shock absorbers and damping due to rubber bushes and the like are not taken into consideration.

SUMMARY

An object of the present disclosure is to provide a suspension stroke related value estimation device and method that are capable of estimating suspension stroke related values with high accuracy based on a vertical acceleration of a sprung without using an observer even in a region where a frequency of a relative vibration between the sprung and an unsprung is relatively high.

According to the present disclosure, a suspension stroke related value estimation device for a vehicle is provided which comprises a damping force generator configured to generate a damping force that damps a relative vibration between a sprung and an unsprung at each wheel position according to a supplied control current, a control unit configured to control a control current supplied to the damping force generator, and a detection device configured to detect a vertical acceleration of the sprung, and is configured to calculate at least one of a relative displacement and a relative velocity between the sprung and the unsprung as a stroke related value for a corresponding suspension.

The control unit includes a storage device that stores relationships between a control current and coefficients of two functions for functionally identifying an equivalent damping coefficient and an equivalent spring constant of each suspension that change according to the control current and a frequency of the relative vibration, and the control unit is configured to determine the coefficients of the two functions based on the control current supplied to the damping force generator and the relationships, and calculate at least one of the relative displacement and relative velocity between the sprung and the unsprung based on a vertical acceleration of the sprung detected by the detection device and the two functions in which the coefficients are determined.

As will be described in detail later, an equivalent damping coefficient and an equivalent spring constant of a suspension not only change according to a control current supplied to the damping force generator, but also change according to a frequency of a relative vibration between the sprung and the unsprung.

According to the above configuration, relationships between a control current and coefficients of two functions for functionally identifying an equivalent damping coefficient and an equivalent spring constant of each suspension that change according to the control current and a frequency of the relative vibration is stored in a storage device. The coefficients of the two functions are determined based on a control current supplied to the damping force generator and the above relationships. Further, at least one of a relative displacement and a relative velocity between the sprung and the unsprung is calculated based on a vertical acceleration of the sprung detected by the detection device and the two functions in which the coefficients are determined.

Therefore, it is possible to specify two functions so that damping due to friction between suspension parts and due to rubber bushes and the like, and therefore non-linearity of a damping force is taken into consideration, and non-linearity of a spring force of the suspension is also taken into consideration. Therefore, as described in detail later, even in a region where a frequency of the relative vibration between the sprung and the unsprung is relatively high, at least one of a relative displacement and a relative velocity between the sprung and the unsprung, that is, suspension stroke related values can be estimated with high accuracy based on a vertical acceleration of the sprung.

In a conventional method of estimating suspension stroke related values using an observer, it is necessary to perform matrix transformation and calculation with Riccati equation every moment in order to design a gain of an observer. Therefore, it takes a lot of time and effort to design the gain and therefore to make the observer.

On the other hand, according to the above configuration, relationships between a control current and coefficients of two functions for functionally identifying an equivalent damping coefficient and an equivalent spring constant of each suspension that change according to the control current and a frequency of the relative vibration has only to be stored in the storage device. The relationships between the coefficients of the two functions and the control current can be obtained, for example, by performing a random vibration test in which each wheel is excited by a four-wheel shaker. Therefore, suspension stroke related values can be estimated without using an observer, and since it is not necessary to spend a lot of time and effort to make an observer, a suspension stroke related value can be estimated more easily than the conventional method.

In one aspect of the present disclosure, the control unit is configured to specify a function for functionally identifying the equivalent spring constant and a function for functionally identifying the equivalent damping coefficient based on the determined coefficients, and calculate a relative displacement between the sprung and the unsprung as a value obtained by dividing a product of a mass of the sprung and a vertical acceleration of the sprung by a sum of a product of the specified function for functionally identifying the equivalent damping coefficient and the Laplace operator and the specified function for functionally identifying the equivalent spring constant.

According to the above aspect, as will be described in detail later, by detecting a vertical acceleration of the sprung by the detection device, a relative displacement between the sprung and the unsprung can be calculated as the above value.

In another aspect of the present disclosure, the control unit is configured to regard a transfer function from a vertical acceleration of the sprung to a relative displacement between the sprung and the unsprung as a product of a first transfer function from a vertical acceleration of the sprung to an intermediate variate and a second transfer function from the intermediate variate to a relative displacement between the sprung and the unsprung to calculate a relative displacement between the sprung and the unsprung.

According to the above aspect, a relative displacement between the sprung and the unsprung can be calculated by regarding a transfer function from a vertical acceleration of the sprung to a relative displacement between the sprung and the unsprung as a product of the first transfer function and the second transfer function.

Further, in another aspect of the present disclosure, the function for functionally identifying the equivalent damping coefficient is a function of at least a first-order lag of a basic equivalent damping coefficient, and the function for functionally identifying the equivalent spring constant is a function of at least a first-order lag and at least a first-order lead of a basic equivalent spring constant.

According to the above aspect, an equivalent damping coefficient and an equivalent spring constant can be functionally identified by the corresponding functions, and the relationships between the coefficients of these two functions and the control current can be stored in the storage device. Furthermore, coefficients of the two functions can be determined based on a control current and the above relationships, and at least one of a relative displacement and a relative velocity between the sprung and the unsprung can be calculated based on a vertical acceleration of the sprung and at least one of the two functions in which the coefficients are determined.

Further, in another aspect of the present disclosure, the control unit is configured to calculate a relative displacement between the sprung and the unsprung as a sum of the intermediate variate, a product of a sum of a time constant of the function of the first-order lag and a delay time constant of the function of the first-order lag and first-order lead and a derivative value of the intermediate variate, and a product of the time constant of the function of the first-order lag, the delay time constant of the function of the first-order lag and first-order lead and a second derivative value of the intermediate variate.

According to the above aspect, as will be described in detail later, a relative displacement between the sprung and the unsprung can be easily calculated as a function of the intermediate variate.

Further, in another aspect of the present disclosure, the control unit is configured to specify a function for functionally identifying the equivalent spring constant and a function for functionally identifying the equivalent damping coefficient based on the determined coefficients, and calculate a relative velocity between the sprung and the unsprung as a value obtained by dividing a product of a mass of the sprung, a vertical acceleration of the sprung and the Laplace operator by a sum of a product of the specified function for functionally identifying the equivalent damping coefficient and the Laplace operator and the specified function for functionally identifying the equivalent spring constant.

According to the above aspect, as will be described in detail later, by detecting a vertical acceleration of the sprung by the detection device, a relative velocity between the sprung and the unsprung can be calculated as the above value.

Further, in another aspect of the present disclosure, the control unit is configured to regard a transfer function from a vertical acceleration of the sprung to a relative velocity between the sprung and the unsprung as a product of a third transfer function from a vertical acceleration of the sprung to an intermediate variate and a fourth transfer function from the intermediate variate to a relative velocity between the sprung and the unsprung to calculate a relative velocity between the sprung and the unsprung.

According to the above aspect, a relative velocity between the sprung and the unsprung can be calculated by regarding a transfer function from a vertical acceleration of the sprung to a relative velocity between the sprung and the unsprung as a product of the third transfer function and the fourth transfer function.

Further, in another aspect of the present disclosure, the function for functionally identifying the equivalent damping coefficient is a function of at least a first-order lag of a basic equivalent damping coefficient, and the function for functionally identifying the equivalent spring constant is a function of at least a first-order lag and at least a first-order lead of a basic equivalent spring constant.

According to the above aspect, an equivalent damping coefficient and an equivalent spring constant can be functionally identified by the corresponding functions, and the relationships between the coefficients of these two functions and the control current can be stored in the storage device. Furthermore, coefficients of the two functions can be determined based on a control current and the above relationships, and at least one of a relative displacement and a relative velocity between the sprung and the unsprung can be calculated based on a vertical acceleration of the sprung and at least one of the two functions in which the coefficients are determined.

Further, in another aspect of the present disclosure, the control unit is configured to calculate a relative velocity between the sprung and the unsprung as a sum of a product of a sum of a time constant of the function of the first-order lag and a delay time constant of the function of the first-order lag and first-order lead and a derivative value of the intermediate variate, and a product of the time constant of the function of the first-order lag, the delay time constant of the function of the first-order lag and first-order lead and a second derivative value of the intermediate variate.

According to the above aspect, as will be described in detail later, a relative velocity between the sprung and the unsprung can be easily calculated as a function of the intermediate variate.

Further, according to the present disclosure, a suspension stroke related value estimation method for a vehicle is provided which calculates at least one of a relative displacement and a relative velocity between a sprung and an unsprung of a vehicle as a suspension stroke related value using a damping force generator configured to generate a damping force that damps a relative vibration between the sprung and the unsprung according to a supplied control current, a storage device that stores relationships between a control current and coefficients of two functions that functionally identify an equivalent damping coefficient and an equivalent spring constant of each suspension that change according to the control current and a frequency of the relative vibration, and a detection device that detects a vertical acceleration of the sprung, comprising:

a step of acquiring a vertical acceleration of the sprung detected by the detection device, a step of acquiring a control current supplied to the damping force generator, a step of determining coefficients of the two functions based on an acquired control current and the relationships stored in the storage device, and a step of calculating at least one of a relative displacement and a relative velocity between the sprung and the unsprung based on an acquired vertical acceleration of the sprung and the two functions for which the coefficients determined.

According to the above method, similar to the estimation device, suspension stroke related values can be estimated with high accuracy based on a vertical acceleration of the sprung even in a region where a frequency of a relative vibration between the sprung and the unsprung is relatively high.

Further, suspension stroke related values can be estimated without using an observer, and since it is not necessary to spend a lot of time and effort to construct an observer, suspension stroke related values can be estimated more easily than a conventional method.

Other objects, other features and attendant advantages of the present disclosure will be readily understood from the description of the embodiments of the present disclosure described with reference to the following drawings.

DETAILED DESCRIPTION

Principle of the Present Disclosure Adopted in the Embodiment

In order to facilitate the understanding of the present disclosure, a principle of the suspension stroke related value estimation device and the method of the present disclosure will be described prior to the description of the embodiment.
<Equivalent Damping Coefficient and Equivalent Spring Constant>

Figure 6:
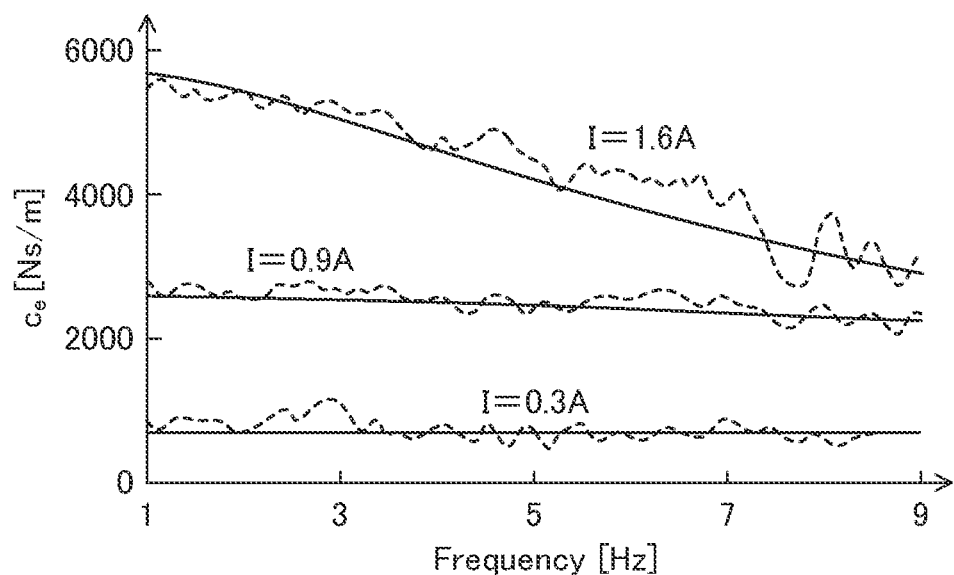
FIG. 6 is a diagram showing an example of a frequency response of an equivalent damping coefficient $c_e$ of a suspension for various control currents 1.
Figure 7:
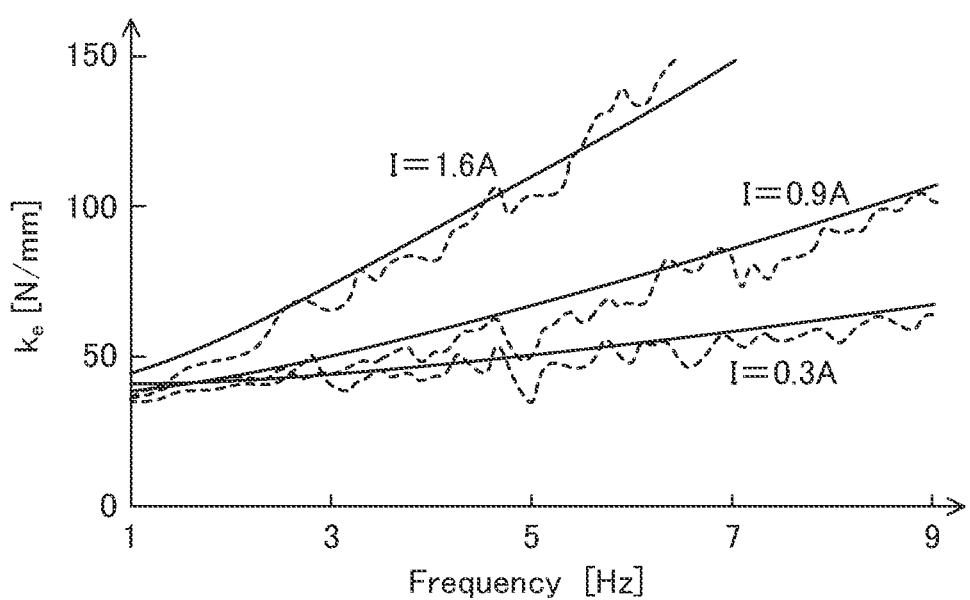
FIG. 7 is a diagram showing an example of a frequency response of an equivalent spring constant $k_e$ of a suspension for various control currents 1.

Although not shown in the drawing, a random vibration test was performed in which a control current I supplied to a variate damping force shock absorber was set to various values and each wheel was vibrated by a four-wheel shaker. A vertical displacement $z_w$ and a vertical velocity $dz_w$ of each wheel were measured. The broken lines in FIGS. 6 and 7 show examples of an equivalent damping coefficient $c_e(I)$ and an equivalent spring constant ke(I) calculated according to the following equations (1) and (2) based on the test results, respectively. The horizontal axis of FIGS. 6 and 7 is a frequency (logarithmic scale) of a relative vibration between a sprung and an unsprung. Therefore, it can be seen that the equivalent damping coefficient $c_e(I)$ and the equivalent spring constant $k_e(I)$ change according to the control current I and the frequency of the relative vibration.

$$c_e(I) = \frac{F_w}{dz_w} \quad (1)$$

$$k_e(I) = \frac{F_w}{z_w} \quad (2)$$

The solid lines in FIGS. 6 and 7 show an equivalent damping coefficient $c_e(I)$ and an equivalent spring constant $k_e(I)$, respectively in which the test results shown by the broken lines are approximated to a gentle curve. The following equations (3) and (4) show functions of the an equivalent damping coefficients $c_{2e}(I)$ and an equivalent spring constant $k_{2e}(I)$ that function-identify the equivalent damping coefficient $c_e(I)$ and the equivalent spring constant $k_e(I)$ shown by the solid lines in FIGS. 6 and 7, respectively. In the equations (3) and (4) and equations described below, s is the Laplace operator. Therefore, the equations (3) and (4) are functions for functionally identifying the equivalent damping coefficient and the equivalent spring constant, respectively of the suspension, which change according to the control current I and the frequency of the relative vibration.

$$c_{2e}(I) = \frac{1}{1 + a_c(I)s} c_0(I) \tag{3}$$

$$k_{2e}(I) = \frac{1 + b_k(I)s}{1 + a_k(I)s} k_0(I) \tag{4}$$

The equation (3) is a function of a first-order lag of a basic equivalent damping coefficient $c_o(I)$, and $a_c(I)$ is a time constant of the first-order lag. The equation (4) is a function of a first-order lag and first-order lead of a basic equivalent spring constant $k_o(I)$, $a_k(I)$ is a time constant of the first-order lag, and $b_k(I)$ is a time constant of the first-order lead. Notably, a vertical displacement $z_w$ and a vertical velocity $dz_w$ of each wheel differ depending on specifications of the vehicle. However, the equivalent damping coefficient $c_2e(I)$ can be identified by a function of at least a first-order lag of the basic equivalent damping coefficient $c_o(I)$ regardless of the specifications of the vehicle. Similarly, the equivalent spring constant $k_{2e}(I)$ can be identified by a function of at least first-order lag and at least first-order lead of the basic equivalent spring constant $k_o(I)$ regardless of the specifications of the vehicle.

In the present application, the basic equivalent damping coefficient $c_o(I)$ and the time constant $a_c(I)$ are referred to as coefficients of the function of the equivalent damping coefficient $c_e(I)$, and the basic equivalent spring constant $k_o(I)$ and the time constants $a_k(I)$ and $b_k(I)$ are referred to as coefficients of the function of the equivalent spring constant $k_e(I)$. That is, the values other than the Laplace operator s in the functions of the equivalent damping coefficient $c_{2e}(I)$ and the equivalent spring constant $k_{2e}(I)$ represented by the equations (3) and (4) are referred to as coefficients of the two functions. The coefficients $c_o(I)$, $a_c(I)$, $k_o(I)$, $a_k(I)$ and $b_k(I)$ are functions of the control current I. and are obtained, for example, by referring to the maps shown in FIGS. 9 to 13. It is to be noted that in FIGS. 9 to 13, (I) of each coefficient is omitted, and (I) of each coefficient is also omitted in the following description as necessary.

<Vehicle Model>

Figure 8:
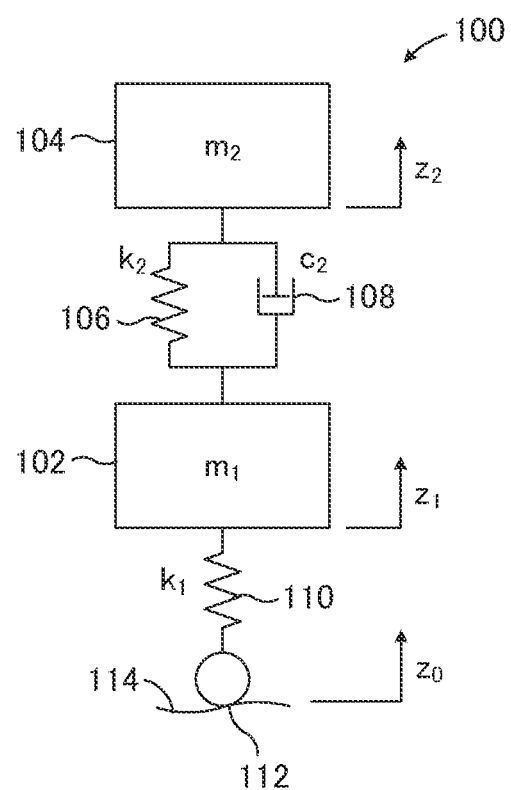
FIG. 8 is a diagram showing a single-wheel model of a vehicle for explaining a principle of estimation in the suspension stroke related value estimation device and method of the present disclosure.
Figure 9:
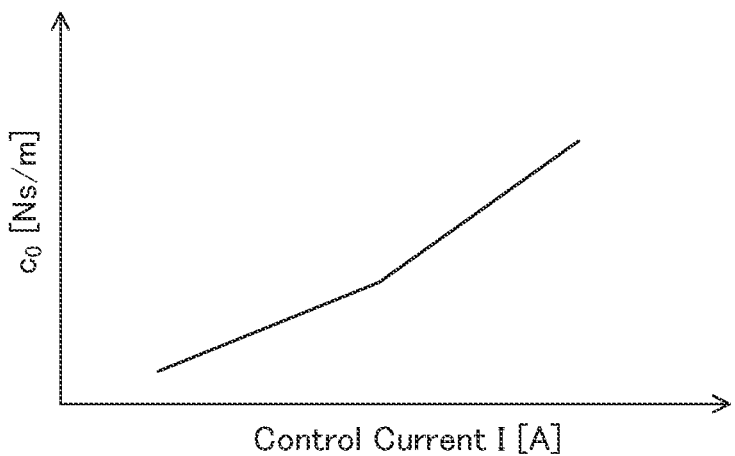
FIG. 9 is a map for determining a coefficient $c_o$ based on a control current I.
Figure 10:
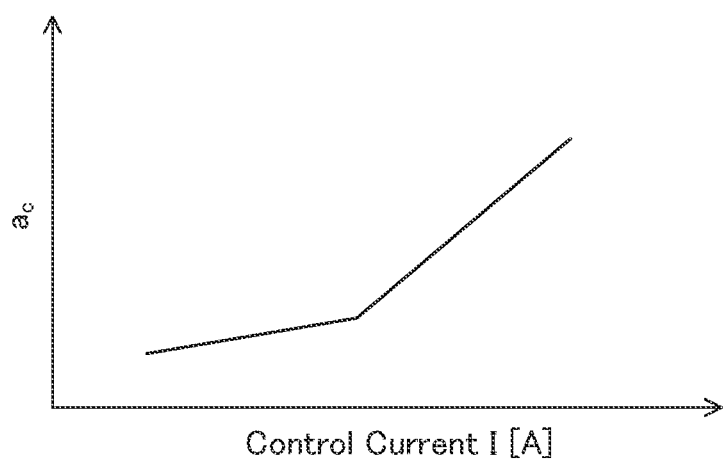
FIG. 10 is a map for determining a coefficient $a_c$ based on a control current I.
Figure 11:
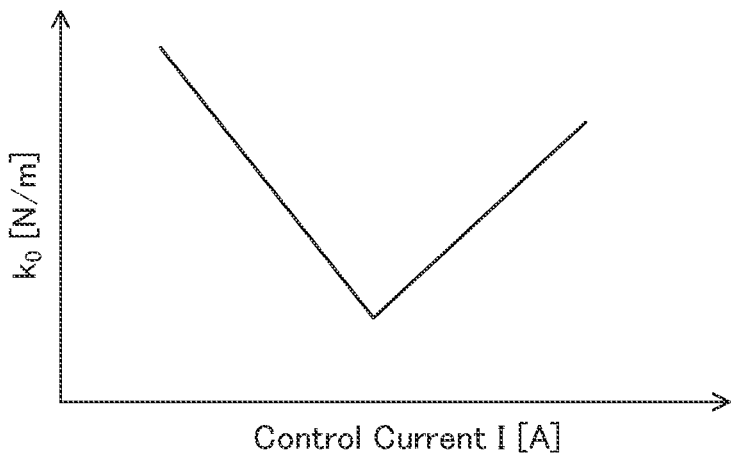
FIG. 11 is a map for determining a coefficient $k_o$ based on a control current I.
Figure 12:
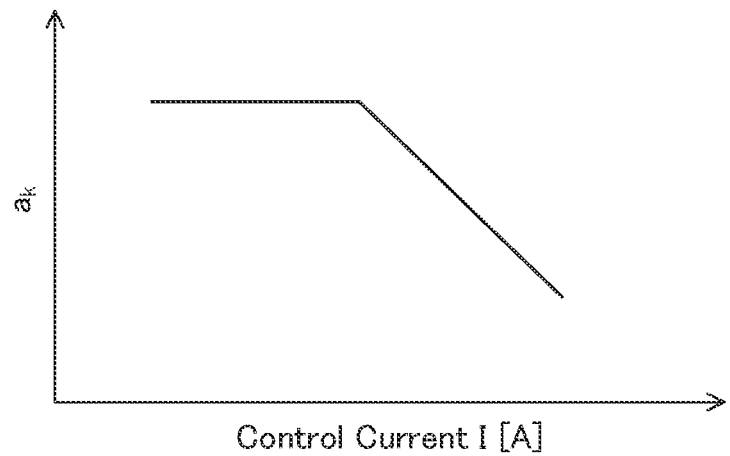
FIG. 12 is a map for determining a coefficient $a_k$ based on a control current I.
Figure 13:
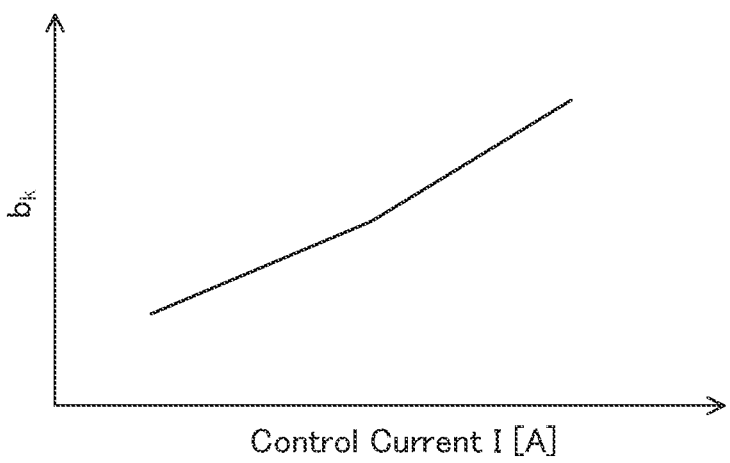
FIG. 13 is a map for determining a coefficient $b_k$ based on a control current I.

FIG. 8 shows a single-wheel model of the vehicle 100 for explaining the principle of estimation in the suspension stroke related value estimation device and method of the present disclosure. In FIG. 8, the reference numerals 102 and 104 show the unsprung and the sprung of the vehicle 100, respectively. A suspension spring 106 and a damper (damping force generator or the like) 108 are provided between the unsprung 102 and the sprung 104. A spring 110 indicates a spring of the unsprung 102.

<Calculation of Relative Displacement>

As shown in FIG. 8, the masses of the unsprung 102 and the sprung 104 are represented by $m_1$ and $m_2$, respectively, and their vertical displacements are represented by $z_1$ and $z_2$, respectively. A spring constant of the spring 106 and a damping coefficient of the damper 108 are represented by $k_2$ and $c_2$, respectively. A spring constant of the spring 110 is represented by $k_1$, and a vertical displacement of a ground contact portion 112 of the unsprung 102, that is, a road surface 114, is represented by $z_0$.

Further, derivative values of the vertical displacements $z_1$ and $z_2$, that is, vertical velocities are represented by $dz_1$ and $dz_2$, respectively, and second-order derivative values of the vertical displacements $z_1$ and $z_2$, that is, vertical accelerations are represented by $ddz_1$ and $ddz_2$, respectively. It is assumed that an upward displacement is positive for $z_1$ and $z_2$, and an upward force is positive for forces generated by the spring 106, the damper 108 and the like.

Equations of motion for vertical movements of the sprung 104 and the unsprung 102 of the vehicle 100 are expressed by the following equations (5) and (6), respectively.

$$m_2 ddz_2 = k_{2e}(z_1 - z_2) + c_{2e}(dz_1 - dz_2) \tag{5}$$

$$m_1 ddz_1 = -k_{2e}(z_1 - z_2) - c_{2e}(dz_1 - dz_2) + k_1(z_0 - z_1) \tag{6}$$

From the above equation (5), a relative displacement $z_s$ between the sprung 104 and the unsprung 102 is expressed by the following equation (7). Therefore, by detecting a vertical acceleration $ddz_2$ of the sprung 104 and determining the coefficients of the above equations (3) and (4) based on a control current I, the equivalent damping coefficient $c_{2e}$ and the equivalent spring constant $k_{2e}$ are specified. Thus, the relative displacement $z_s$ can be calculated according to the following equation (7) Notably, the mass $m_2$ of the sprung 104 is known. Further, there is a certain relationship between the coefficients of the above equations (3) and (4) and the control current I, and the relationships can be experimentally obtained as described later.

$$z_s = z_1 - z_2 \tag{7}$$

$$= \frac{1}{k_{2e} + c_{2e}s} m_2 ddz_2$$

By substituting the above equations (3) and (4) into the above equation (7), the relative displacement $z_s$ between the sprung 104 and the unsprung 102 is expressed by the following equation (8).

$$z_s = \frac{1}{\frac{1 + b_k(I)s}{1 + a_k(I)s} k_0(I) + \frac{1}{1 + a_c(I)s} c_0(I)s} m_2 ddz_2 \tag{8}$$

$$= \frac{(1 + a_k s)(1 + a_c s)}{(1 + b_k s)(1 + a_c s)k_0 + (1 + a_k s)c_0 s} m_2 ddz_2$$

$$= \frac{1 + (a_k + a_c)s + a_k a_c s^2}{k_0 + [(b_k + a_c)k_0 + c_0]s + (a_c b_k k_0 + a_k c_0)s^2} m_2 ddz_2$$

Assuming that a transfer function from a vertical acceleration $ddz_2$ of the sprung 104 to a relative displacement $z_s$ is a product of a first transfer function $y/ddz_2$ from the vertical acceleration $ddz_2$ to an intermediate variate y and a second transfer function $z_s/y$ from the intermediate variate y to the relative displacement $z_s$, a transfer function from the vertical acceleration $ddz_2$ to the relative displacement $z_s$ is expressed by the following equation (9).

$$\frac{z_s}{ddz_2} = \frac{y}{ddz_2} \cdot \frac{z_s}{y} \tag{9}$$

-continued $$= \frac{1 + (a_k + a_c)s + a_k a_c s^2}{k_0 + [(b_k + a_c)k_0 + c_0]s + (a_c b_k k_0 + a_k c_0)s^2} m_2$$

It is assumed that the second transfer function $z_s/y$ from the intermediate variate y to the relative displacement $z_s$ is expressed by the following equation (10), and the first transfer function $y/ddz_2$ from the vertical acceleration $ddz_2$ to the intermediate variate y is expressed by the equation (11).

$$\frac{z_s}{y} = 1 + (a_k + a_c)s + a_k a_c s^2 \quad (10)$$

$$\frac{y}{ddz_2} = \frac{m_2}{k_0 + [(b_k + a_c)k_0 + c_0]s + (a_c b_k k_0 + a_k c_0)s^2} \quad (11)$$

Representing a derivative value and a second derivative value of the intermediate variate y as dy and ddy, respectively, the relative displacement $z_s$ is expressed by the following equation (12) corresponding to the above equation (10). Further, since the following equation (13) is established from the above equation (11), the second derivative ddy of the intermediate variate y is expressed by the following equation (14).

$$z_s = y + (a_k + a_c)dy + a_k a_c ddy \quad (12)$$

$$m_2 ddz_2 = k_0 y + [(b_k + a_c)k_0 + c_0]dy + (a_c b_k k_0 + a_k c_0)ddy \quad (13)$$

$$ddy = \frac{1}{a_c b_k k_0 + a_k c_0}\{m_2 ddz_2 - k_0 y - [(b_k + a_c)k_0 + c_0]dy\} \quad (14)$$

In the first embodiment described later, as will be described in detail later, a vertical acceleration $ddz_2$ of the sprung 104 is detected, the coefficients $c_o$, $a_c$, $k_o$, $a_k$ and $b_k$ are calculated based on a control current I, and a relative displacement (suspension stroke) $z_s$ is calculated using the above equations (12) and (14). If necessary, a relative velocity (suspension stroke velocity) $dz_s$ may be calculated as a derivative value of the relative displacement $z_s$.

Further, since the following equation (15) corresponding to the above equation (7) is established, a relative velocity $dz_s$ can be calculated according to the equation (15).

$$dz_s = dz_1 - dz_2 \quad (15)$$

$$= \frac{s}{k_{2e} + c_{2e}s} m_2 ddz_2$$

Assuming that a transfer function from the vertical acceleration $ddz_2$ to the relative velocity $dz_s$ of the sprung 104 is a product of a third transfer function $y/ddz_2$ from the vertical acceleration $ddz_2$ to the intermediate variate y and a fourth transfer function from the intermediate variate y to the relative velocity $dz_s$, a transfer function from the vertical acceleration $ddz_2$ to a relative velocity $dz_s$ is expressed by the following equation (16).

$$\frac{dz_s}{ddz_2} = \frac{y}{ddz_2} \cdot \frac{dz_s}{y} \quad (16)$$

-continued $$= \frac{1 + (a_k + a_c)s + a_k a_c s^2}{k_0 + [(b_k + a_c)k_0 + c_0]s + (a_c b_k k_0 + a_k c_0)s^2} m_s s$$

It is assumed that the fourth transfer function $dz_s/y$ from the intermediate variate y to the relative velocity $dz_s$ is expressed by the following equation (17), and the third transfer function $y/ddz_2$ from the vertical acceleration $ddz_2$ to the intermediate variate y is expressed by the equation (18).

$$\frac{dz_s}{y} = 1 + (a_k + a_c)s + a_k a_c s^2 \quad (17)$$

$$\frac{y}{ddz_2} = \frac{m_2 s}{k_0 + [(b_k + a_c)k_0 + c_0]s + (a_c b_k k_0 + a_k c_0)s^2} \quad (18)$$

The relative velocity $dz_s$ is expressed by the following equation (19) corresponding to the above equation (17). Further, since the following equation (20) is established from the above equation (18), the second derivative ddy of the intermediate variate y is expressed by the following equation (21).

$$dz_s = y + (a_k + a_c)dy + a_k a_c ddy \quad (19)$$

$$m_2 sddz_2 = k_0 y + [(b_k + a_c)k_0 + c_0]dy + (a_c b_k k_0 + a_k c_0)ddy \quad (20)$$

$$ddy = \frac{1}{a_c b_k k_0 + a_k c_0}\{m_2 sddz_2 - k_0 y - [(b_k + a_c)k_0 + c_0]dy\} \quad (21)$$

In the second embodiment described later, as will be described in detail later, a vertical acceleration $ddz_2$ of the sprung 104 is detected, the coefficients $c_o$, $a_c$, $k_o$, $a_k$ and $b_k$ are calculated based on a control current I. and a relative velocity (suspension stroke velocity) $dz_s$ is calculated using the above equations (19) and (21). If necessary, a relative displacement (suspension stroke) $z_s$ may be calculated as an integral value of the relative velocity $dz_s$.

Embodiment

The present disclosure will now be described in detail with reference to the accompanying drawings.

<Configuration Common to the First and Second Embodiments>

Figure 1:
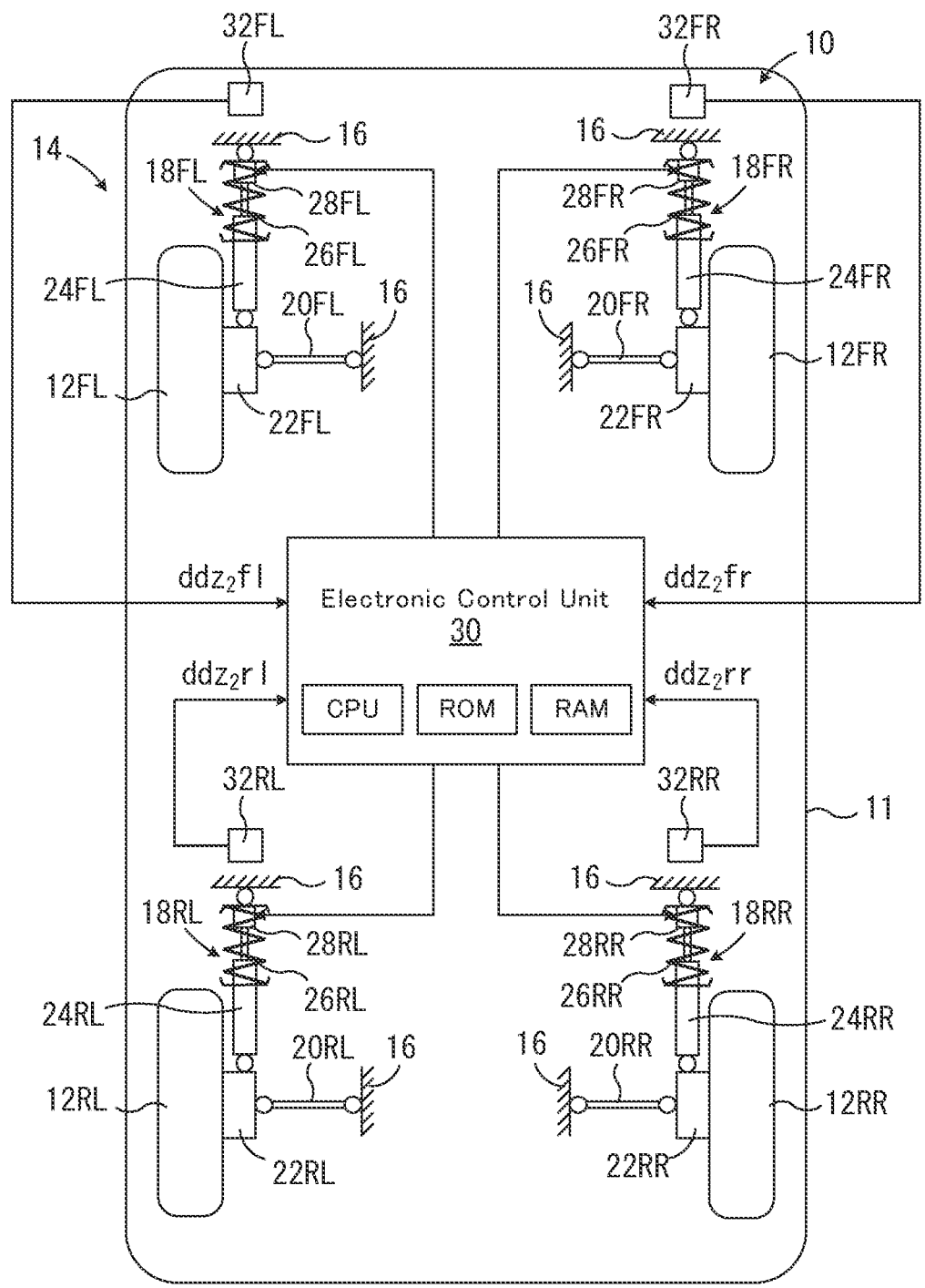
FIG. 1 is a schematic configuration diagram showing a first embodiment of a damping control apparatus to which the suspension stroke related value estimation device according to the present disclosure is applied.

As shown in FIG. 1, the suspension stroke related value estimation device 10 of the first and second embodiments is applied to a damping control apparatus 14 of a vehicle 11. The vehicle 11 has left and right front wheels 12FL and 12FR which are steering wheels, and left and right rear wheels 12RL and 12RR which are non-steering wheels. Further, the vehicle 11 has front wheel suspensions 18FL and 18FR that suspend the front wheels 12FL and 12FR from a vehicle body 16, respectively and rear wheel suspensions 18RL and 18RR that suspend the rear wheels 12RL and 12RR from the vehicle body 16, respectively.

The front wheel suspensions 18FL and 18FR include suspension arms 20FL and 20FR, respectively, and the rear wheel suspensions 18RL and 18RR include suspension arms 20RL and 20RR, respectively. In FIG. 1, only one suspension arm 20FL to 20RR is shown, but a plurality of these arms may be provided.

The front wheels 12FL and 12FR are rotatably supported around rotation axes (not shown) by wheel support members 22FL and 22FR, respectively, and the wheel support members 22FL and 22FR are connected to the vehicle body 16 by the suspension arms 20FL and 20FR, respectively. Similarly, the rear wheels 12RL and 12RR are rotatably supported around rotation axes (not shown) by wheel support members 22RL and 22RR, respectively, and the wheel support members 22RL and 22RR are connected to the vehicle body 16 by the suspension arms 20RL and 20RR, respectively.

The front wheel suspensions 18FL and 18FR include shock absorbers 24FL and 24FR which function as damping force generators and suspension springs 26FL and 26FR, respectively. Similarly, the rear wheel suspensions 18RL and 18RR include shock absorbers 24RL and 24RR which function as damping force generators and suspension springs 26RL and 26RR, respectively.

In the illustrated embodiment, each shock absorber is connected to the vehicle body 16 at an upper end and to the corresponding wheel support member at a lower end. Each suspension spring is mounted between the vehicle body 16 and the wheel support member via the corresponding shock absorber. However, each shock absorber and suspension spring may be arranged between the vehicle body 16 and the wheel support member or the suspension arm.

The suspensions 18FL to 18RR may be any type of suspension as long as the wheels 12FL to 12RR and the vehicle body 16 are allowed to be displaced in the vertical direction with respect to each other. Further, each suspension spring 26FL to 26RR may be arbitrary springs such as a compression coil spring and an air spring.

As can be seen from the above description, at least the vehicle body 16 constitutes a sprung of the vehicle 11, and at least the wheels 12FL to 12RR and the wheel support members 22FL to 22RR constitute an unsprung of the vehicle 11.

The shock absorbers 24FL to 24RR are shock absorbers of variate damping force type having actuators 28FL to 28RR, respectively. Each actuator is configured to vary an effective passage cross-sectional area of a variate orifice provided on a piston (not shown) to vary a damping coefficient by means of a control current supplied to the actuator being controlled by an electronic control unit 30. The shock absorbers 24FL to 24RR may be shock absorbers having any configuration known in the art as long as a damping coefficient can be changed by controlling a control current.

As shown in FIG. 1, the vehicle body 16 is provided with vertical acceleration sensors 32FL, 32FR, 32RL and 32RR, respectively that detect vertical accelerations $ddz_2i$ of the sprung at positions corresponding to the left and right front wheels 12FL and 12FR and the left and right rear wheels 12RL and 12RR. Each signal indicating the vertical acceleration $ddz_2i$ is input to the electronic control unit 30. In addition, i is fl, fr, rl and rr that mean the left front wheel, the right front wheel, the left rear wheel and the right rear wheel, respectively.

Although not shown in detail in FIG. 1, the electronic control unit 30 includes a microprocessor and a drive circuit. The microcomputer has a CPU, a ROM, a RAM, and an input/output port device, and has a general configuration in which these are connected to each other by a bidirectional common bus. A control program for controlling the shock absorbers 24FL to 24RR is stored in the ROM functioning as a storage device, and the shock absorbers 24FL to 24RR are controlled by the CPU according to the control program.

Further, the ROM functions as a storage device for storing maps for calculating coefficients such as $c_o$ and $a_c$, that is, maps shown in FIGS. 9 to 13. Further, the ROM stores a map for calculating control currents to be supplied to the actuators 28FL to 28RR, that is, target control currents Iti based on relative velocities $dz_si$. Coefficients such as $c_o$ and $a_c$ may be values common to all suspensions. However, in general, specifications of the front wheel suspensions 18FL and 18FR are the same as each other and specifications of the rear wheel suspensions 18RL and 18RR are the same as each other, but the specifications of the front wheel suspensions and the specifications of the rear wheel suspensions are different from each other. Therefore, in the first and second embodiments, coefficients such as $c_o$ and $a_c$ are calculated for the front wheels and the rear wheels.

<Damping Control in the First Embodiment>

As will be described in detail later, in the first embodiment, the electronic control unit 30 calculates a relative displacement $z_si$ and a relative velocity $dz_si$ between the sprung and the unsprung for each wheel according to the flowchart shown in FIG. 2 and a control program corresponding to the block diagram shown in FIG. 3. Further, the electronic control unit 30 calculates target control currents Iti based on the relative velocities $dz_si$, and controls control currents Ii supplied to the actuators so that the control currents Ii become the corresponding target control currents Iti.

Next, the damping control in the first embodiment will be described with reference to the flowchart shown in FIG. 2. The damping control according to the flowchart shown in FIG. 2 is repeatedly executed by the CPU of the electronic control unit 30 at predetermined time intervals in the order of, for example, the left front wheel, the right front wheel, the left rear wheel, and the right rear wheel when an ignition switch (not shown in the figure) is ON. This also applies to the control by the flowchart shown in FIG. 4 described later.

First, in step 210, the CPU reads a signal indicating a vertical acceleration $ddz_2i$ of the sprung detected by corresponding one of the vertical acceleration sensors 32FL to 32RR and stores it in the RAM.

In step 220, the CPU reads a previous value Ifi of the control current supplied to corresponding one of the actuators 28FL to 28RR and stores it in the RAM.

In step 230, the CPU determines the coefficients $c_o$, $a_c$, $k_o$, $a_k$ and $b_k$ by referring to the maps shown in FIGS. 9 to 13 based on the previous value Ifi of the control current, and stores the coefficients in the RAM. Notably, when the previous value Ifi of the control current is Ifl or Ifr, the coefficients for the corresponding front wheel are calculated, and when the previous value Ifi of the control current is Ifl or Ifr, the coefficients for the corresponding rear wheel are calculated.

In step 240, as will be described in detail later, the CPU calculates a relative displacement $z_si$ between the sprung and the unsprung based on the vertical acceleration $ddz_2i$ of the sprung and the coefficients $c_o$, $a_c$, $k_o$, $a_k$ and $b_k$ according to the block diagram shown in FIG. 3.

In step 250, the CPU calculates a relative velocity $dz_si$ between the sprung and the unsprung as a derivative value of the relative displacement $z_si$.

In step 260, the CPU calculates a control current to be supplied to corresponding one of the actuators 28FL to 28RR, that is, a target control current Iti, from a map not shown in the drawing based on the relative velocity $dz_si$.

In step 270, the CPU controls a control current Ii supplied to corresponding one of the actuators 28FL to 28RR so that the control current becomes the corresponding target control current Iti, thereby controlling a damping coefficient of corresponding one of the shock absorbers 24FL to 24RR.

Figure 3:
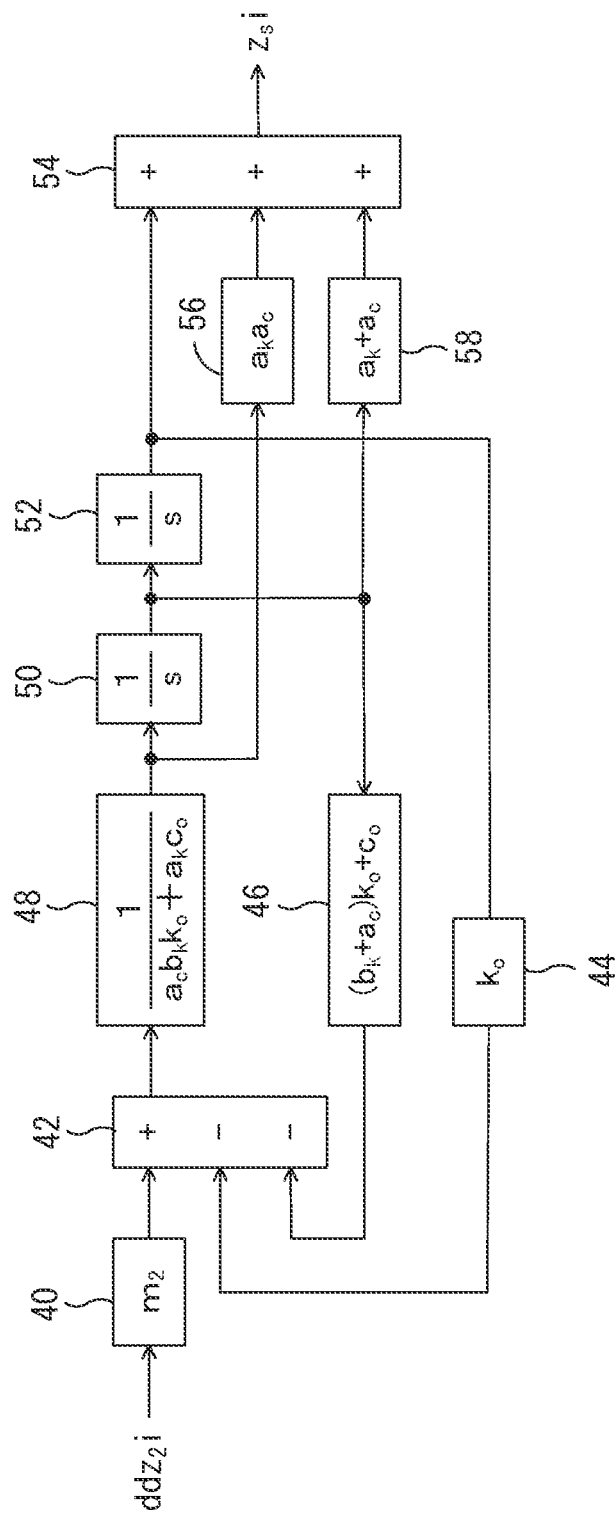
FIG. 3 is a block diagram of calculation of a relative displacement $z_s i$ performed in step 240 in the flowchart shown in FIG. 2.

As shown in FIG. 3, a vertical acceleration ddz$_2$i of the sprung is input to a multiplier block 40, and a product m$_2$ddz$_2$i of the vertical acceleration ddz$_2$i and the mass m$_2$ of the sprung, which is the output of the multiplier block 40, is input to a positive input terminal of an adder block 42. A product k$_o$y of the coefficient k$_o$ and the intermediate variate y is input to a negative input terminal of the adder block 42 from a multiplier block 44 described later. Further, a product [(bk+ac) ko+co] dy of a value (bk+ac) ko+co in a square bracket on the right side of the above equation (14) and a derivative value dy of the intermediate variate y is input to the other negative input terminal of the addition block 42.

An output of the adder block 42 is a value in a curly brace on the right side of the above equation (14) and is input to a multiplier block 48 so that it is multiplied by a coefficient 1/(a$_c$b$_k$k$_o$+a$_k$c$_o$) for a curly brace on the right side of the above equation (14) by the multiplier block 48. Therefore, an output of the multiplier block 48 is a value on the right side of the above equation (14), and thus represents a second-order derivative ddy of the intermediate variate y.

The output of the multiplier block 48 is input to an adder block 54 as the intermediate variate y via integrator blocks 50 and 52. Further, the output of the multiplier block 48 is input to a multiplier block 56, and a product a$_k$a$_c$ddy of the second-order derivative value ddy of the intermediate variate y and a product a$_k$a$_c$ of the coefficients, which is the output of the multiplier block 56, is input to the adder block 54. Further, an output of the integrator block 50, that is, a derivative value dy of the intermediate variate y is input to a multiplier block 58, and a product (a$_k$+a$_c$) dy of the derivative value dy of the intermediate variate y and a sum a$_k$+a$_c$ of the coefficients, which is the output of the multiplier block 58, is input to the adder block 54.

Therefore, an output of the adder block 54 is a value on the right side of the above equation (12), and thus represents a relative displacement (suspension stroke) z$_s$i between the sprung and the unsprung. The output of the integrator block 50, that is, the derivative value dy of the intermediate variate y, is input to a multiplier block 46 which multiplies a value (b$_k$+a$_c$) k$_o$+c$_o$ in the square bracket on the right side of the equation (14). The output of the integrator block 52, i.e. the intermediate variate y, is input to the above-mentioned multiplier block 44, which multiplies the coefficient k$_o$.

As can be seen from the above description, the electronic control unit 30 cooperates with the vertical acceleration sensors 32FL to 32RR to function as a suspension stroke related value estimation device that estimates relative displacements z$_s$i and a relative velocities dz$_s$i between the sprung and the unsprung by executing steps 210 to 250.

In the first embodiment, the step of acquiring a vertical acceleration of the sprung and the step of acquiring a previous value of the control current supplied to the damping force generator in the estimation method of the present disclosure are achieved by steps 210 and 220, respectively. Further, the step of determining the coefficients is accomplished by steps 230, and the step of calculating at least one of the relative displacement and the relative velocity between the sprung and the unsprung is accomplished by steps 240 and 250.

<Damping Control in the Second Embodiment>

As will be described in detail later, in the second embodiment, the electronic control unit 30 calculates a relative velocity dz$_s$i between the sprung and the unsprung for each wheel according to the flowchart shown in FIG. 4 and a control program corresponding to the block diagram shown in FIG. 5. Further, also in this embodiment, the electronic control unit 30 calculates a target control current Iti based on the relative velocity dz$_s$i, and controls the control current Ii supplied to each actuator so that the control current Ii becomes the corresponding target control current Iti.

Next, the damping control in the second embodiment will be described with reference to the flowchart shown in FIG. 4.

Figure 2:
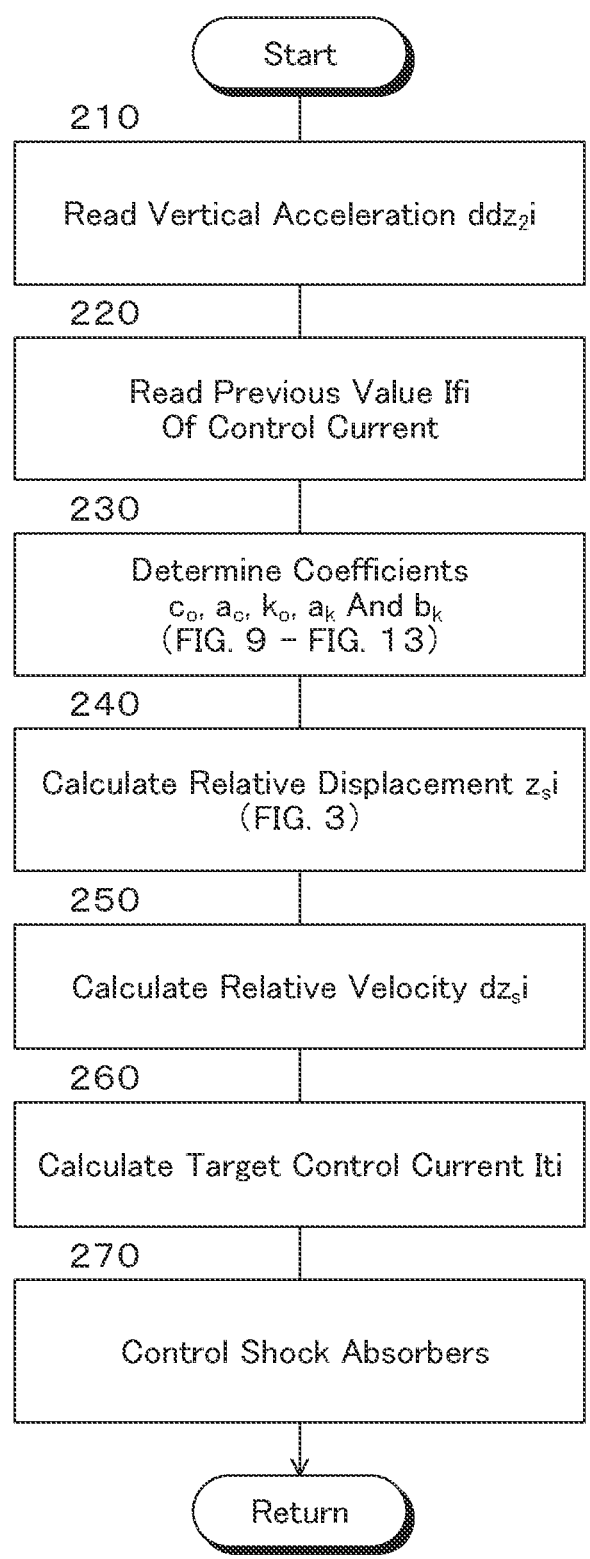
FIG. 2 is a flowchart showing a damping control routine according to the first embodiment.
Figure 4:
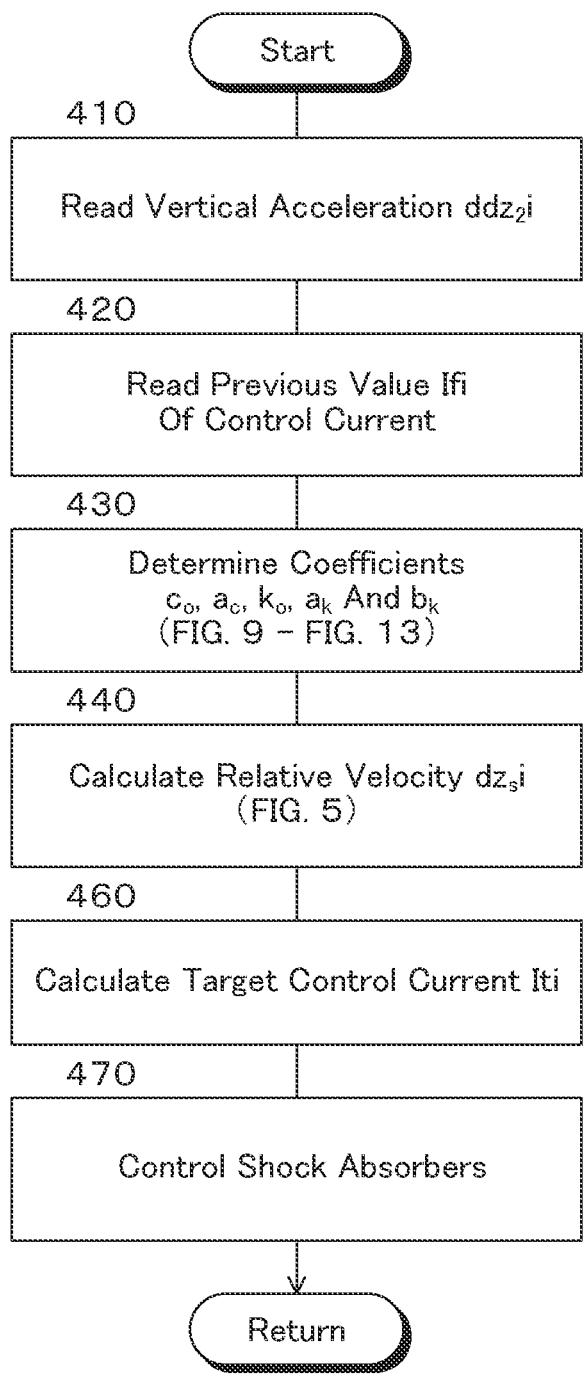
FIG. 4 is a flowchart showing a damping control routine according to the second embodiment.

As can be seen from the comparison between FIGS. 4 and 2, the CPU executes steps 410 to 430 in the same manner as in steps 210 to 230, respectively. Therefore, the description of steps 410 to 430 will be omitted.

In step 440, as will be described in detail later, the CPU calculates a relative velocity dz$_s$i between the sprung and the unsprung based on the vertical acceleration ddz$_2$i of the sprung and the coefficients c$_o$, a$_c$, k$_o$, a$_k$ and b$_k$ according to the block diagram shown in FIG. 5. In FIG. 5, the blocks corresponding to the blocks shown in FIG. 3 are assigned the same reference numerals as those assigned in FIG. 3.

The CPU does not execute a step corresponding to step 250. Steps 460 and 470 are performed in the same manner as steps 260 and 270, respectively. Therefore, the description of steps 460 and 470 will be omitted.

Figure 5:
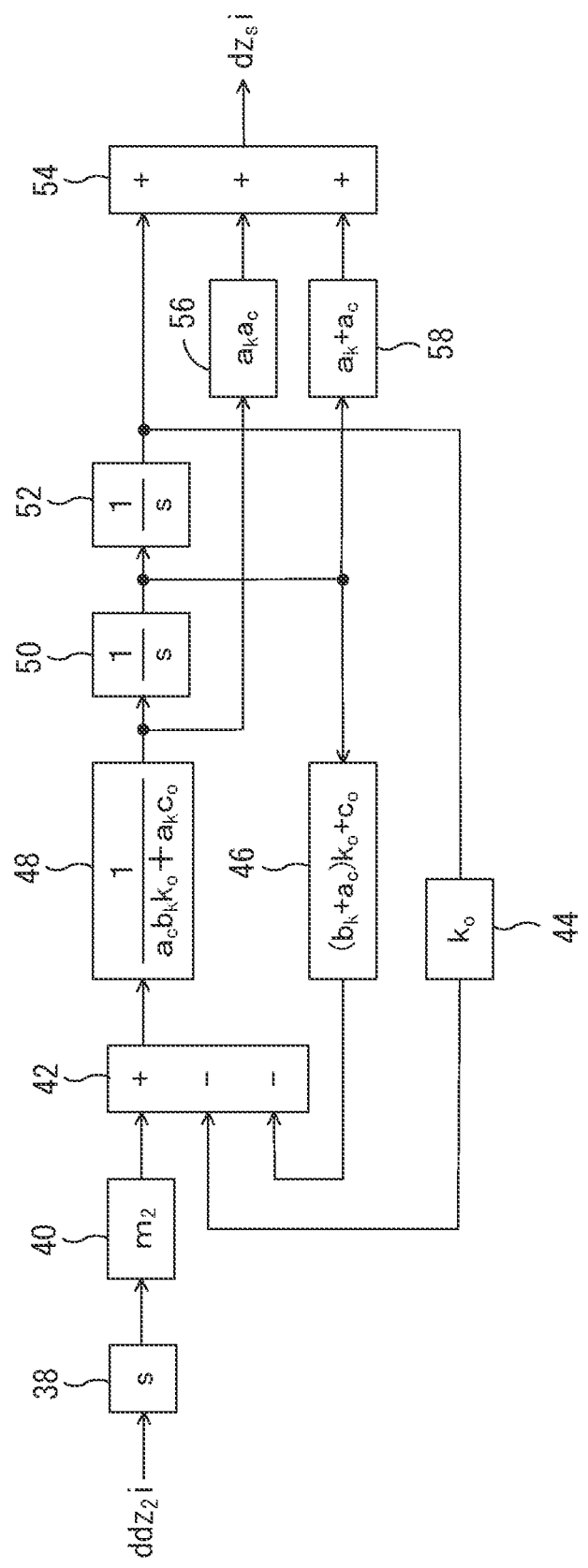
FIG. 5 is a block diagram of calculation of a relative velocity $dz_s i$ performed in step 440 of the flowchart shown in FIG. 4.

As can be seen from the comparison between FIGS. 5 and 3, a differentiator block 38 is provided. A vertical acceleration ddz$_2$i of the sprung is input to the differentiator block 38, and a product sddz$_2$i of the Laplace operator s and the vertical acceleration ddz$_2$i of the sprung, which is an output of the differentiator block 38, is input to a multiplier block 40. An output of the multiplier block 40, that is, a product m$_2$sddz$_2$i of the mass m$_2$ of the sprung and the sddz$_2$i is input to a positive input terminal of an adder block 42. Therefore, an output of the adder block 42 is a value in the curly brace on the right side of the above equation (21).

An output of a multiplier block 48 is a value on the right side of the above equation (21), and thus represents a second-order derivative ddy of the intermediate variate y. An output of an integrator block 50 is a derivative dy of the intermediate variate y, and an output of an integrator block 52 is the intermediate variate y. Therefore, an output of the adder block 54 is a value on the right side of the above equation (19), and thus represents a relative velocity (suspension stroke velocity) dz$_s$i between the sprung and the unsprung. In the second embodiment, a relative displacement (suspension stroke) z$_s$ may be calculated by integrating the relative velocity dz$_s$.

As can be seen from the above description, the electronic control unit 30 cooperates with the vertical acceleration sensors 32FL to 32RR to function as a suspension stroke related value estimation device that estimates relative velocities dz$_s$i between the sprung and the unsprung by executing steps 410 to 440.

In the second embodiment, the step of acquiring a vertical acceleration of the sprung and the step of acquiring previous values of control currents supplied to the damping force generators in the estimation method of the present disclosure are achieved by steps 410 and 420, respectively. Further, the step of determining the coefficients is accomplished by step 430, and the step of calculating at least one of a relative displacement and a relative velocity between the sprung and the unsprung is accomplished by step 440.

Further, as can be seen from the above description, according to the first and second embodiments, relationships between the coefficients c$_o$, a$_c$, k$_o$, a$_k$ and b$_k$ of the two functions that functionally identify an equivalent damping coefficient c$_e$(I) and an equivalent spring constant k$_e$(I) of each suspension that change according to a control current I and a frequency of the relative vibration and the control current I are stored in the storage device (ROM). The coefficients of the two functions are determined based on the control currents supplied to the shock absorbers 24FL to 24RR serving as the damping force generators and the above relationship. Further, at least one of a relative displacement $z_s$ and a relative velocity $dz_s$ between the sprung and the unsprung is calculated based on a vertical acceleration $ddz_2$ of the sprung detected by the vertical acceleration sensors 32FL to 32RR serving as the detection device and the two functions in which the coefficients are determined.

Therefore, it is possible to specify two functions so that damping due to friction between suspension parts and due to rubber bushes and the like, and therefore non-linearity of a damping force is taken into consideration, and non-linearity of a spring force of the suspension is also taken into consideration. Therefore, even in a region where a frequency of the relative vibration between the sprung and the unsprung is relatively high, a suspension stroke related value can be estimated with high accuracy based on the vertical acceleration of the sprung.

Figure 14:
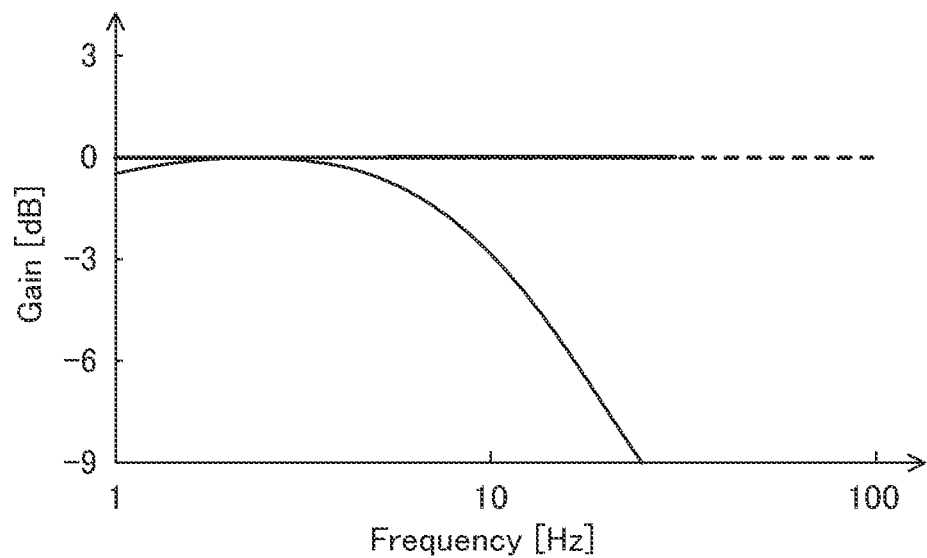
FIG. 14 is a diagram showing an example of a gain characteristic of transfer from a true value to an estimated value of a stroke velocity of a suspension in the embodiment (thick solid line) and in a prior art (thin solid line).
Figure 15:
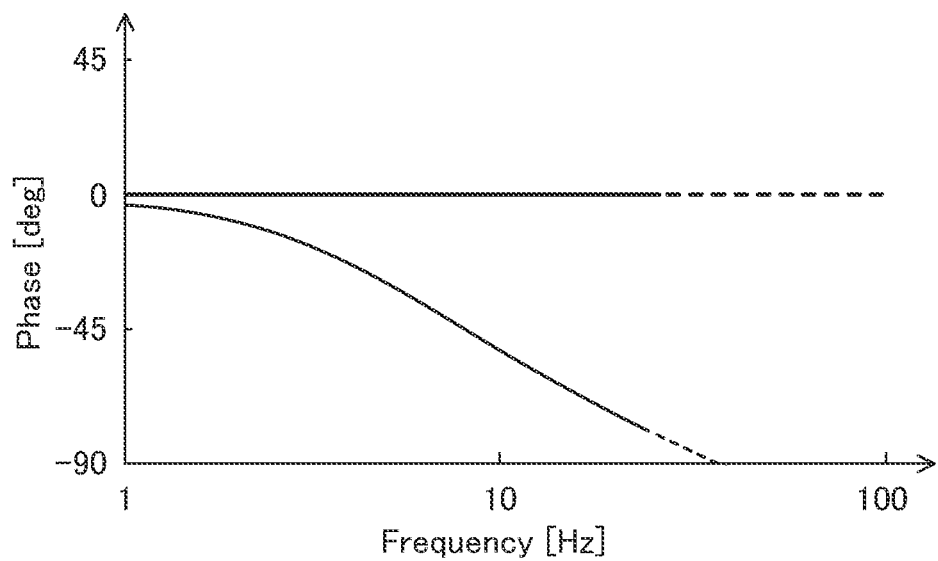
FIG. 15 is a diagram showing an example of a phase characteristic of transfer from a true value to an estimated value of a stroke velocity of a suspension in the embodiment (thick solid line) and in a prior art (thin solid line).

For example, FIGS. 14 and 15 show examples of gain characteristics and phase characteristics of transfer from a true value to an estimated value of a stroke velocity of a suspension in the embodiments (thick solid line) and in the prior art (thin solid line), respectively. In FIGS. 14 and 15, the broken lines indicate that the gain characteristic and the phase characteristic vary according to a frequency of a relative vibration.

In the prior art, that is, in the estimation methods of Patent Documents 1 and 2 described above, in a region where a frequency of a relative vibration between a sprung and an unsprung is relatively high, as the frequency increases, the gain decreases and a phase shift between the true and estimated values increases. The decrease of the gain and the phase shift also occur in a region lower than a resonance frequency of the unsprung, and increase as the frequency of the relative vibration increases. Therefore, it is not possible to estimate a stroke velocity of a suspension with high accuracy in a region where the frequency of the relative vibration is relatively high.

On the other hand, according to the first and second embodiments, even in a region where a frequency of the relative vibration is high around a resonance frequency of the unsprung, the gain does not decrease and the phase shift between a true value and an estimated value does not increase. Therefore, a stroke velocity of a suspension can be estimated with high accuracy even in a region where the frequency of the relative vibration is relatively high.

Although not shown in the drawing, a gain characteristic and a phase characteristic of a transfer from a true value to an estimated value of a suspension stroke are also the same as the characteristics shown in FIGS. 14 and 15, respectively. Therefore, according to the first and second embodiments, a suspension stroke can be estimated with high accuracy even in a region where the frequency of the relative vibration is relatively high.

Further, according to the first and second embodiments, suspension stroke related values can be estimated without using an observer, and it is not necessary to spend a lot of time and effort to construct the observer, so suspension stroke related values can be estimated more easily than with conventional methods.

Further, according to the first and second embodiments, the equivalent damping coefficient $c_{2e}(I)$ and the equivalent spring constant $k_{2e}(I)$ can be functionally identified by the corresponding functions (equations (3) and (4), respectively), and the relationships between the coefficients $c_o$, $a_c$, $k_o$, $a_k$ and $b_k$ of those functions and the control current I can be stored in the ROM serving as a storage device. Further, the coefficients of the two functions are determined based on the control current I and the above relationships, and at least one of a relative displacement $z_s$ and a relative velocity $dz_s$ between a sprung and an unsprung can be calculated based on a vertical acceleration $ddz_2$ of the sprung and the two functions in which the coefficients are determined.

Further, according to the first and second embodiments, suspension stroke related values can be calculated by detecting a vertical acceleration $ddz_2$ of the sprung by the vertical acceleration sensors 32FL to 32RR and acquiring the control currents supplied to the shock absorbers 24FL to 24RR.

In particular, according to the first embodiment, a relative displacement $z_s$ between a sprung and an unsprung can be calculated by regarding a transfer function $z_s/ddz_2$ from a vertical acceleration of the sprung to a relative displacement between the sprung and the unsprung as a product of the first transfer function $y/ddz_2$ and the second function $z_s/y$.

On the other hand, according to the second embodiment, a relative velocity $dz_s$ between a sprung and an unsprung can be calculated by regarding a transfer function $dz_s/ddz_2$ from a vertical acceleration of the sprung to a relative velocity between the sprung and the unsprung as a product of the third transfer function $y/ddz_2$ and the fourth transfer function $dz_s/y$.

Further, according to the first and second embodiments, a suspension stroke related value can be easily calculated by the functions of the intermediate variate y (equations (12) and (19)).

Although the present disclosure has been described in detail with reference to specific embodiments, it will be apparent to those skilled in the art that the present disclosure is not limited to the above-described embodiments, and various other embodiments are possible within the scope of the present disclosure.

For example, in the first and second embodiments, the equivalent damping coefficient $c_e(I)$ is a function represented by the equation (3), that is, a function of the first-order lag of the basic equivalent damping coefficient $c_o(I)$. However, the equivalent damping coefficient may be a function of second-order or higher-order lag. Similarly, the equivalent spring constant $k_e(I)$ is a function represented by the equation (4), that is, a function of the first-order lag and first-order lead of the basic equivalent spring constant $k_o(I)$. However, the equivalent spring constant may be a function of second-order or higher-order lag and second-order or higher-order lead. Again in these modification examples, the coefficients of each function are calculated based on a previous value Ifi of the control current.

Further, in the first and second embodiments, a vertical acceleration $ddz_2i$ of the sprung at the position of each wheel is detected by the vertical acceleration sensors 32FL to 32RR provided corresponding to each wheel. However, any one of the vertical acceleration sensors 32FL, 32FR, 32RL and 32RR may be omitted and a vertical acceleration at the position where the vertical acceleration sensor is omitted may be estimated based on the detected values of the three vertical acceleration sensors. Further, a vertical acceleration $ddz_2i$ of the sprung at the position of each wheel may be calculated based on a pitch rate of the sprung detected by a pitch rate sensor and a roll rate of the sprung detected by a roll rate sensor.

Further, in the first and second embodiments, a damping coefficient of each shock absorber is controlled based on a calculated relative velocity $dz_s i$ between the sprung and the unsprung. However, a relative displacement $z_s i$ and/or a relative velocity $dz_s i$ calculated by the suspension stroke related value estimation device of the present disclosure may be used for other vehicle controls. The other vehicle controls include, for example, damping control by actively controlling a control force acting between a sprung and an unsprung, posture control to control posture of a sprung, and suspension control to control ride comfort of a vehicle and so on.

What is claimed is:

1. A suspension stroke related value estimation device for a vehicle, comprising a damping force generator configured to generate a damping force that damps a relative vibration between a sprung and an unsprung at each wheel position according to a supplied control current, a control unit configured to control the control current supplied to the damping force generator, and a detection device configured to detect a vertical acceleration of the sprung, and is configured to calculate at least one of a relative displacement and a relative velocity between the sprung and the unsprung as a stroke related value for a corresponding suspension, wherein the control unit includes a storage device that stores relationships between the supplied control current and coefficients of two functions for functionally identifying an equivalent damping coefficient and an equivalent spring constant of each suspension that change according to the control current and a frequency of the relative vibration, the control unit is configured to determine the coefficients of the two functions based on the control current supplied to the damping force generator and the relationships, and calculate at least one of the relative displacement and relative velocity between the sprung and the unsprung based on the vertical acceleration of the sprung detected by the detection device and the two functions in which the coefficients are determined.

2. The suspension stroke related value estimation device for a vehicle according to claim 1, wherein the control unit is configured to specify a function for functionally identifying the equivalent spring constant and a function for functionally identifying the equivalent damping coefficient based on the determined coefficients, and calculate the relative displacement between the sprung and the unsprung as a value obtained by dividing a product of a mass of the sprung and a vertical acceleration of the sprung by a sum of a product of the specified function for functionally identifying the equivalent damping coefficient and the Laplace operator and the specified function for functionally identifying the equivalent spring constant.

3. The suspension stroke related value estimation device for a vehicle according to claim 2, wherein the control unit is configured to regard a transfer function from the vertical acceleration of the sprung to the relative displacement between the sprung and the unsprung as a product of a first transfer function from the vertical acceleration of the sprung to an intermediate variate and a second transfer function from the intermediate variate to the relative displacement between the sprung and the unsprung to calculate the relative displacement between the sprung and the unsprung.

4. The suspension stroke related value estimation device for a vehicle according to claim 3, wherein the function for functionally identifying the equivalent damping coefficient is a function of at least a first-order lag of a basic equivalent damping coefficient, and the function for functionally identifying the equivalent spring constant is a function of at least a first-order lag and at least a first-order lead of a basic equivalent spring constant.

5. The suspension stroke related value estimation device for a vehicle according to claim 4, wherein the control unit is configured to calculate the relative displacement between the sprung and the unsprung as a sum of the intermediate variate, a product of a sum of a time constant of the function of the first-order lag and a delay time constant of the function of the first-order lag and first-order lead and a derivative value of the intermediate variate, and a product of the time constant of the function of the first-order lag, the delay time constant of the function of the first-order lag and first-order lead and a second derivative value of the intermediate variate.

6. The suspension stroke related value estimation device for a vehicle according to claim 1, wherein the control unit is configured to specify a function for functionally identifying the equivalent spring constant and a function for functionally identifying the equivalent damping coefficient based on the determined coefficients, and calculate the relative velocity between the sprung and the unsprung as a value obtained by dividing a product of a mass of the sprung, the vertical acceleration of the sprung and the Laplace operator by a sum of a product of the specified function for functionally identifying the equivalent damping coefficient and the Laplace operator and the specified function for functionally identifying the equivalent spring constant.

7. The suspension stroke related value estimation device for a vehicle according to claim 6, wherein the control unit is configured to regard a transfer function from the vertical acceleration of the sprung to the relative velocity between the sprung and the unsprung as a product of a third transfer function from the vertical acceleration of the sprung to an intermediate variate and a fourth transfer function from the intermediate variate to the relative velocity between the sprung and the unsprung to calculate the relative velocity between the sprung and the unsprung.

8. The suspension stroke related value estimation device for a vehicle according to claim 7, wherein the function for functionally identifying the equivalent damping coefficient is a function of at least a first-order lag of a basic equivalent damping coefficient, and the function for functionally identifying the equivalent spring constant is a function of at least a first-order lag and at least a first-order lead of a basic equivalent spring constant.

9. The suspension stroke related value estimation device for a vehicle according to claim 8, wherein the control unit is configured to calculate the relative velocity between the sprung and the unsprung as a sum of a product of a sum of a time constant of the function of the first-order lag and a delay time constant of the function of the first-order lag and first-order lead and a derivative value of the intermediate variate, and a product of the time constant of the function of the first-order lag, the delay time constant of the function of the first-order lag and first-order lead and a second derivative value of the intermediate variate.

10. The suspension stroke related value estimation device for a vehicle according to claim 1, wherein the control unit is configured to control the damping force generator by supplying the control current thereto in order to generate a damping force that damps a relative vibration between the sprung and the unsprung.

11. A suspension stroke related value estimation method for a vehicle which calculates at least one of a relative displacement and a relative velocity between a sprung and an unsprung of the vehicle as a suspension stroke related value using a damping force generator configured to generate a damping force that damps a relative vibration between the sprung and the unsprung according to a supplied control current, a storage device that stores relationships between the supplied control current and coefficients of two functions that functionally identify an equivalent damping coefficient and an equivalent spring constant of the suspension that change according to the supplied control current and a frequency of the relative vibration, and a detection device that detects a vertical acceleration of the sprung, comprising:
- a step of acquiring a vertical acceleration of the sprung detected by the detection device,
- a step of acquiring the control current supplied to the damping force generator,
- a step of determining coefficients of the two functions based on the acquired control current and the relationships stored in the storage device,
- a step of calculating at least one of a relative displacement and a relative velocity between the sprung and the unsprung based on the acquired vertical acceleration of the sprung and the two functions for which the coefficients are determined, and
- a step of controlling the damping force generator by supplying the control current to the damping force generator in order to generate a damping force that damps the relative vibration between the sprung and the unsprung.

* * * * *